(12) United States Patent
Andreev et al.

(10) Patent No.: US 6,662,287 B1
(45) Date of Patent: Dec. 9, 2003

(54) FAST FREE MEMORY ADDRESS CONTROLLER

(75) Inventors: Alexander E. Andreev, San Jose, CA (US); Anatoli A. Bolotov, Cupertino, CA (US); Ranko Scepanovic, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 245 days.

(21) Appl. No.: 10/000,243

(22) Filed: Oct. 18, 2001

(51) Int. Cl.[7] .............................................. G06F 12/00
(52) U.S. Cl. ...................... 711/170; 711/154; 711/217; 707/205
(58) Field of Search ............................. 707/205; 711/2, 711/5, 6, 153, 154, 170, 202, 213, 215, 217

(56) References Cited

U.S. PATENT DOCUMENTS

2003/0137509 A1 * 7/2003 Bauer et al. ................ 345/419

\* cited by examiner

Primary Examiner—Donald Sparks
Assistant Examiner—Christian P. Chace
(74) Attorney, Agent, or Firm—Westman, Champlin & Kelly (57) ABSTRACT

A memory manager for managing allocation of addresses in the memory is structured as a hierarchical tree having a top vertex, a bottom level and at least one intermediate level. The bottom level contains a plurality of bottom vertices each containing a plurality of representations of a Free or Taken status of respective addresses in the memory. Each intermediate contains at least one hierarchy vertex containing a plurality of labels such that each label is associated with a child vertex and defines whether or not a path that includes the respective child vertex ends in a respective bottom level vertex containing at least one Free representation. An allocation command changes the representation of the first Free address to Taken and a free command changes the representation of a specified address to Free. The labels in hierarchical vertices are changed to reflect the path conditions to the bottom vertices.

20 Claims, 7 Drawing Sheets

FAST FREE MEMORY ADDRESS CONTROLLER

FIELD OF THE INVENTION

This invention relates to management of free addresses, and particularly to free address management employing a hierarchical tree for reduced latency with minimal increased external memory.

BACKGROUND OF THE INVENTION

In the synthesis of VLSI designs for storage systems and for communication devices, it is often necessary to make use of a manager of free addresses in an external memory storage. Memory access, such as for read and write memory operations, can usually be accomplished with arbitrarily chosen memory addresses in one time unit (e.g., one clock cycle). It is also desired that other operations, such as initialization and reset operations be accomplished in small time periods, most preferably in one time unit (one clock cycle). Such a situation arises when managing free indices in fast flexible search engines, such as described in application Ser. Nos. 09/679,209 and 09/679,313 both filed Oct. 4, 2000 by Andreev et al. for "Fast Flexible Search Engine for Longest Prefix Match" and for "Flexible Search Engine Having Sorted Binary Tree for Perfect Match" and assigned to the same assignee as the present invention.

Previously, free address management techniques required unsatisfactory timing requirements for allocation and freeing operations, excessive time for initialization and reset operations, and/or excessive external memory consumption.

A memory manager manages read and write operations of an external memory. A set of memory addresses, herein called "indices", $I=\{0,1, \ldots n\}$ contains subsets of Free indices and Taken (also called "allocated") indices. An ALLOC command will output a Free index (if any) from set I thereby allocating the index, and a FREE command will change a Taken index to a Free index. RESET and INIT commands will reset and initialize the memory.

Prior memory managers managed indices either as a characteristic array of all (Free and Taken) indices of the set I, or by managing the stack or list of only the Free indices.

A memory manager managing indices as a characteristic array of Free and Taken indices requires an external memory having a capacity of n bits, where n is the total number of indices to be distributed. Hence, external memory consumption is only 1 bit per index. The worst-case latency, in clock cycles, of the manager (when looking for a Free index) is approximately n/2k, where 2k is the word length in bits used in the external memory (typically, k=16, 32 or 64). A reset operation also requires approximately n/2k clock cycles. This management technique offers the advantage of minimal memory requirements of only n bits. However, where the number n of indices is large, for example where n is greater than 1024, the latency and reset requirements are unacceptable.

A memory manager managing a stack or list of only Free indices requires an external memory having a capacity of $n \cdot \log_2 n$ bits, with each index requiring $\log_2 n$ bits. The worst-case latency of the manager (when looking for a Free index) is only one clock cycle (since every index in the stack or list is, by definition, a Free index). However, a worst-case reset operation requires approximately n clock cycles. While the latency is quite satisfactory at one time unit (one clock cycle), memory consumption ($n \cdot \log_2 n$ bits) and reset time (n cycles) are unsatisfactory.

Thus, in one way or in another, these prior techniques for managing free addresses (or indices) are ineffective for practical implementation where a fast running module interacts with an external memory. The present invention provides a solution to these and other problems, and offers advantages over the prior art.

SUMMARY OF THE INVENTION

In one embodiment, a storage memory contains a memory manager for managing allocation of addresses in the memory. The memory manager is structured, as a hierarchical tree having a top vertex, a bottom level and at least one intermediate level between the top vertex and bottom level. The bottom level contains a plurality of bottom vertices each containing a plurality of representations of a Free or Taken status of respective addresses in the memory. Each intermediate level contains at least one hierarchy vertex containing a plurality of labels. Each label is associated with a child vertex and defines whether or not a path that includes the respective child vertex ends in a respective bottom level vertex containing at least one Free representation.

Another embodiment of the invention is a process of managing free addresses in a memory. A hierarchical tree contains a plurality of vertices arranged in a plurality of levels such that a bottom level contains a plurality of bottom vertices each containing a plurality of representations of a Free or Taken status of respective addresses in the memory and at least one intermediate level contains at least one hierarchy vertex containing a plurality of labels defining whether or not a path that includes the respective child vertex ends in a respective bottom level vertex containing at least one Free representation. A memory command is input to the tree, and the representation of the status of an address in a bottom level vertex is changed based on the command.

In some embodiments, if the command is an allocate command, a search is performed through the tree, starting at the top vertex, to locate a Fee address in a vertex in the bottom level. The status of that address is changed to Taken and labels are changed in vertices in the intermediate level(s) as appropriate, depending on the status of other representations in that bottom level vertex.

In other embodiments, if the command is a Free command to set free a designated address, the representation in the bottom level vertex associated with that address is changed to Free and labels are changed in vertices in intermediate level(s) as appropriate, depending on the status of other representations in that bottom level vertex.

In other embodiments, the invention is manifest in computer readable code that is stored on a computer readable medium to cause the computer to perform the processes of the invention. The medium may be a transportable medium, such as a floppy disc medium, and includes code causing the computer to structure the tree in the memory containing the addresses.

DETAILED DESCRIPTION OF THE PREFERRED EMBODIMENTS

The present invention is directed to a memory management technique that employs a hierarchical labeled tree. Reset operations are eliminated by using additional labels for each subtree. The result is a memory management that is performed with a maximal latency based on a logarithmic time scale and that requires a minimal increase of external memory (about 2 to 7%).

Figure 1:
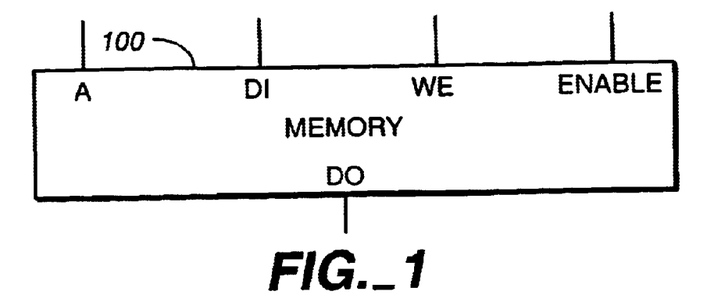
FIG. 1 is a diagram illustrating an external memory to be managed.

FIG. 1 illustrates an external memory as used in one embodiment of the present invention. The external memory is a standard module that is commercially available from any of several sources. It is represented by an array memory 100 containing MSize words of equal length of 2k bits, where k is a parameter—typically k=16, 32 or 64. Each word is stored in memory 100 at an address A, where A is binary word having a length equal to $\log_2$Msize bits. For example, if memory 100 contains 1024 words (MSize=1024), the length of each address A is 10 bits ($\log_2$MSize=10). In the general case, the length of the address is equal to the smallest integer that is greater than or equal to the logarithm (base 2) of MSize, i.e. $\log_2$MSize=ceil($\log_2$MSize) where ceil( ) is the C library function.

External memory 100 functions at discrete units of time t=0,1,2,3, . . . corresponding to clock cycles. At each clock cycle, memory 100 can be in an active (enabled) or inactive (disabled) state, depending on the state of the ENABLE flag. When memory is active (i.e., ENABLE=1) memory 100 can perform either of two operations—READ or WRITE. When performing a READ operation at given address A, a word DO (data_out) is output from the location in memory 100 addressed by address A, i.e., DO=MEMORY[A]. When performing a WRITE operation at address A with a word DI (data_in) input to the memory, word DI is written into the memory at address A and any nonempty content at that location is erased, i.e., MEMORY[A]=DI. The type of operation, READ or WRITE, is determined by the state of auxiliary flag WE (write_enable). If WE=1 then a WRITE operation is performed. Otherwise, if WE=0 a READ operation is performed.

Figure 2:
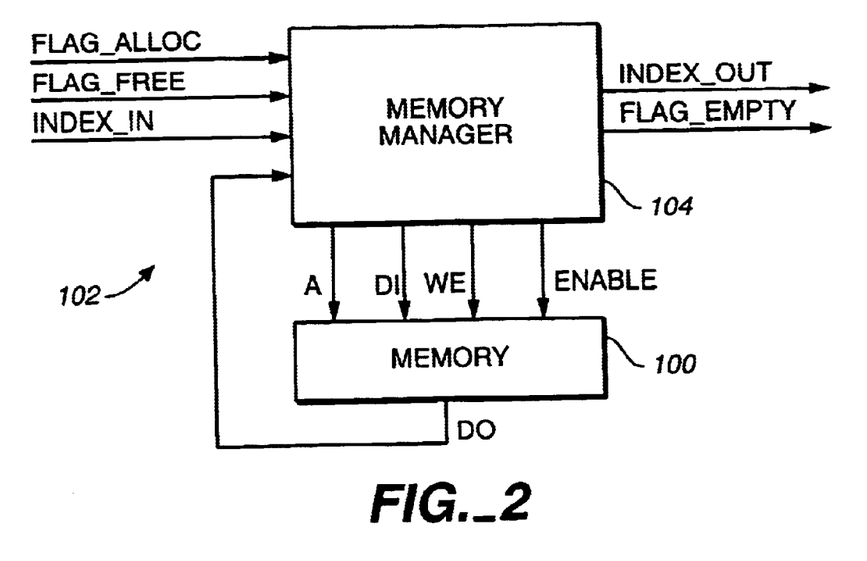
FIG. 2 is a block diagram of a memory management system for managing the memory illustrated in FIG. 1.

FIG. 2 illustrates an index controller 102 comprising a memory manager 104 coupled to memory 100. Controller 102 functions in discrete units of time t=0,1,2,3, . . . , for example individual clock cycles. Controller 102 has three inputs, consisting of two 1-bit flags FLAG_ALLOC and FLAG_FREE, and an input word INDEX_IN having a length of Len bits. These three inputs are input to memory manager 104 along with DO word from memory 100. Controller 102 also has two outputs comprising an output word INDEX_OUT having a length of Len bits and an output 1-bit flag FLAG_EMPTY. These two outputs are output from memory manager 104, which also outputs the DI and A words and WE and ENABLE flags to memory 100.

Controller 102 performs processes of allocation and setting free of indices in memory 100 under control of an external device (not shown) that provides the FLAG_ALLOC, FLAG_FREE and INDEX_IN inputs (directly or via controller driver) and utilizes the INDEX_OUT and FLAG_EMPTY outputs for its own purpose.

Figure 3:
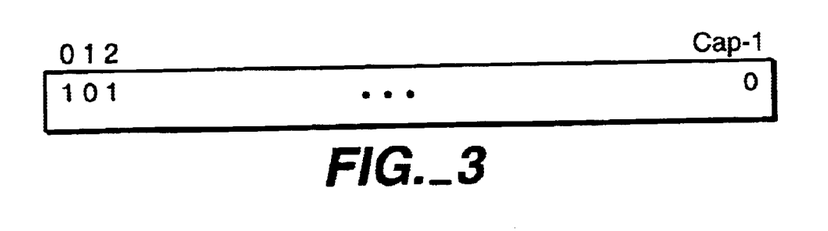
FIG. 3 illustrates an arrangement of Free and Taken index representations useful in explaining an aspect of the present invention.

The controller operates on a set of indices I={0,1, . . . ,Cap−1}, where Cap is the total number of indices established by the user. Each Index is a binary word of the length Len, where Len=ceil ($\log_2$Cap). Each index i has a status S that is either Free or Taken. The status S(i,t) of given index i is changed by the controller depending on whether the index i is being allocated or set free at the current time t. In other words, S(i,t)=Free means that index i is set Free at time t and can be allocated once more (can be Taken) on executing a later allocation command by the controller. If S(i,t)=Taken then index i is already used by the external device. Consequently, before using index i in the future the index must be first set Free again. Thus, during any given time unit (e.g., clock cycle), t is fixed. Consequently, S(i,t) appears as a characteristic function of Free and Taken indices at the time unit t. FIG. 3 illustrates an example of the status of the indices 0,1,2, . . . ,Cap−1, where status value 1 represents a Taken status and status value 0 represents a Free status.

Index controller 102 operates in accordance with the following set of rules:

1. Initially INDEX_OUT=0, FLAG_EMPTY=0 and status of the index 0 is 1 (i.e. Taken) and the status of all other indices are set to 0 (i.e. Free). Further, reset of the controller requires one unit of time.
2. An ALLOC command is a combination input flag values of FLAG_ALLOC=1 and FLAG_FREE=0 at time t. A FREE command is a combination of input flag values of FLAG_ALLOC=0 and FLAG_FREE=1 at time t. A REALLOC command is a combination of input flag values of FLAG_ALLOC=1 and FLAG$_{-13\ FREE}$ 1 at time t.
3. If an ALLOC or FREE command occurs at time t, controller 102 remains in the operating state for d units of time (i.e., d clock cycles). The value of d depends of the current characteristic functions of Taken indices at the time t. D is the maximal value of d and represents controller latency.
4. If the controller is in an operating state (i.e. it is performing an ALLOC or FREE command), arrival of a new ALLOC or FREE or REALLOC command during time d causes an error. If the controller is in a non-operating state (i.e., the time d for performing an ALLOC or FREE command has expired) the outputs remain unchanged until new command arrives. Consequently, while in the non-operating state, the outputs just computed are available to the external device by controller 102.
5. The FREE command may address only an index whose status is Taken, and the ALLOC command addresses only an index whose status is Free. Otherwise an error occurs.
6. If the last Free index is Taken the controller outputs new value of FLAG_EMPTY, i.e. FLAG_EMPTY=1.
7. If FLAG_EMPTY=1 then the controller can only perform FREE and REALLOC commands. Before any ALLOC command can be performed, at least one FREE command must be completed to thereby set FLAG_EMPTY=0. If FLAG EMPTY=1, an ALLOC command causes an error.

An ALLOC command (namely, FLAG_ALLOC=1 and FLAG_FREE=0 at time t) operates controller 102 to an operating state to find a Free index i and change its status to Taken. This operation requires no more than d time units (d clock cycles). At time t+d, the controller outputs the index or address (INDEX_OUT=i). The index i will be continuously output from memory manager 104 until a new command arrives. If index i is the last Free index from the set of all indices, memory manager 104 changes the status of FLAG_EMPTY to 1 at time t+1.

A FREE command (namely, FLAG_ALLOC=0 and FLAG_FREE=1 at time t) operates controller 102 to an operating state. An index i identified by INDEX_IN to manager 104 determines the address location in memory 100. The status of index i in memory 100 is changed to Free by time t+d. FLAG_EMPTY is set to 0 at time t+1 if FLAG_EMPTY had been 1. INDEX_OUT remains unchanged until a new command arrives.

A REALLOC command (namely, FLAG_ALLOC=1 and FLAG_FREE=1) operates controller 102 to output at time t+1 the index that is input at time t. Hence, INDEX_IN=i at time t and INDEX_OUT=i at time t+1. FLAG_EMPTY is not changed.

Figure 4:
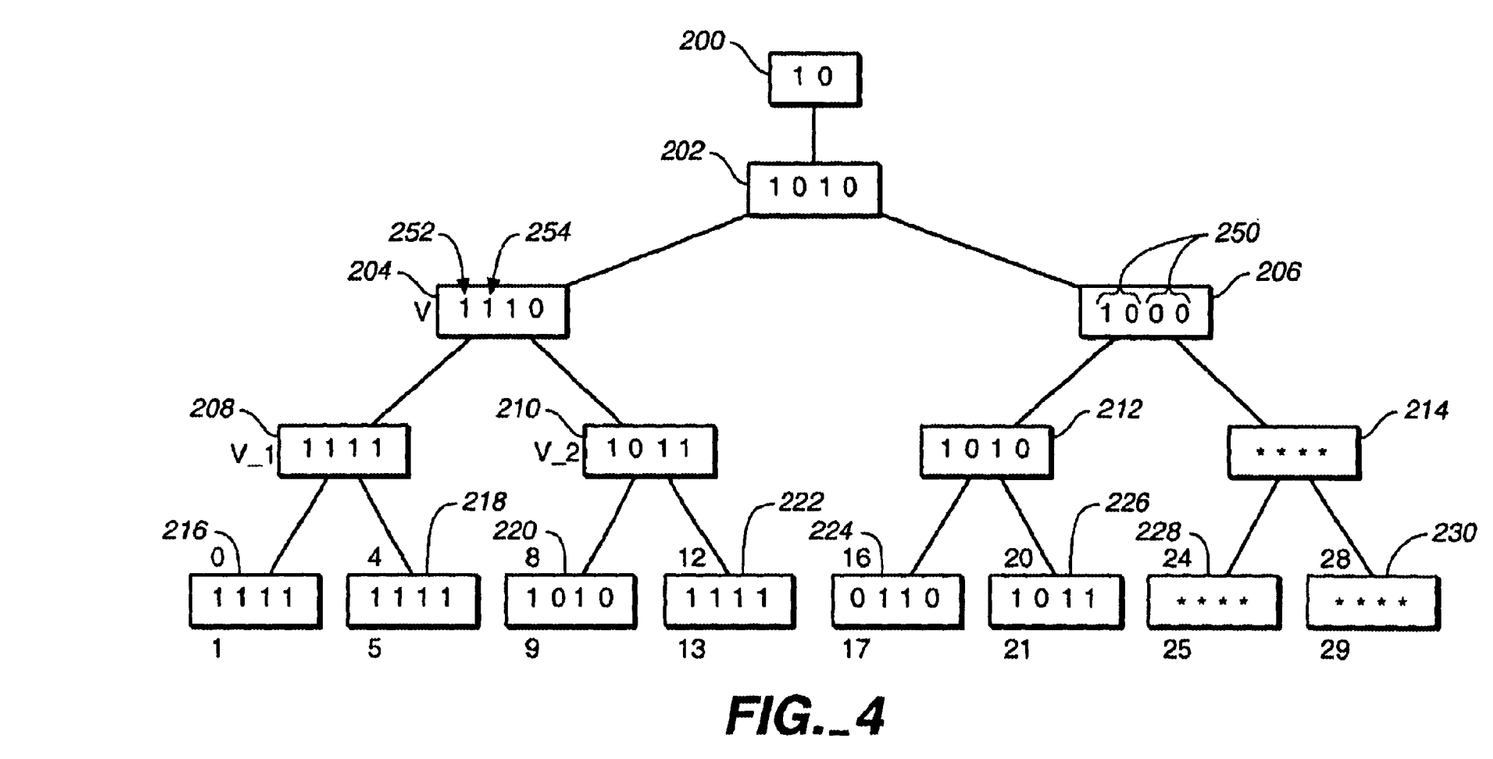
FIGS. 4–9 are representations illustrating various operations of a labeled hierarchical tree employed by the apparatus illustrated in FIG. 2 in managing an external memory.

Memory manager 104 is similar to a k-nary tree All with special 2-bit labels 1_S for each subtree S of the tree. FIG. 4 is an example of the tree containing four levels and where k=2. An entry top word or vertex is shown at 200. A zero level contains vertex 202. A first level contains vertices 204 and 206 that are both children of vertex 202. A second level contains vertices 208 and 210 that are children of vertex 204, and vertices 212 and 214 that are children of vertex 206. A bottom level contains vertices or leaves 216 and 218 that are children of vertex 208, vertices or leaves 220 and 222 that are children of vertex 210, vertices or leaves 224 and 226 that are children of vertex 212, and vertices or leaves 228 and 230 that are children of vertex 214. Two subtree labels 250 are attached to each vertex other than a bottom vertex. Each subtree label consists of a first bit 252 that designates whether or not the subtree has been visited since last reset and a second bit 254 that designates whether or not there are vertices in the bottom level of the subtree containing representations of Free indices. For example, the subtree label "11" appearing in vertex 204 means that the subtree whose parent is vertex 208 has been visited since the last reset and that the bottom vertices 216 and 218 represents only Taken indices. The subtree label "10" appearing in vertex 204 means that the subtree whose parent is vertex 210 has been visited since the last reset and that at least one bottom vertex 220 and/or 222 includes a representation of a Free index (in other words, not all indices represented by the subtree whose parent is vertex 210 are Taken). Therefore, with the exception of index 0, the vertices 216–230 of the bottom level represent the characteristic array for Free and Taken indices. As will be more fully described below, index 0 is managed differently and on the fly. The bits of the 2-bit top word 200 has the same meaning for entire tree.

Each internal vertex v of the tree can be viewed as a word having a length of 2k bits consisting of (in a natural order from left to right) k 2-bit labels representing the status of k subtrees at k child vertices v_1,v_2, . . . ,v_k. The vertices 216–230 located at the bottom level of the tree also appear as 2k-bit words but they are representative of the characteristic function (Taken=1, Free=0) of all of the indices (except index 0) of memory 100. FIG. 3 is a representation of the contents of all of the bottom vertices 216–230 plus index 0.

Thus the subtree label L_i[0] designates whether subtree T_i has been visited since last reset, and L_i[1] designates whether there are Free vertices in the bottom level of that subtree. A word L[v]=(L_1,L_2, . . . ,L_k) is associated with each vertex v and consists of 2-bit subtree labels L_1,L_2, . . . ,L_k. The first bit 252 of the subtree label is FLAG_EXIST, and second bit 254 of the subtree label is FLAG_FULL. The flags are arranged so that all FLAG_EXIST flags 252 occupy even positions in the vertex label L[v] (numbering the positions from 0), and all FLAG_FULL flags 254 occupy odd positions. All vertices 216–230 of the tree (from left to right) can be viewed as a characteristic array of all indices in memory 100 starting with the index 1. Index 0 is treated separately.

Index 0 is considered "on the fly". On executing an ALLOC command, the status of index 0 is checked to identify if index 0 is Free or Taken. If index 0 is Free, controller 102 takes index 0 and changes its status to Taken. If index 0 is Taken, the controller goes to the labeled tree to look for a Free index there. In the case of a FREE command, the status of index 0 is simply changed to Free.

Thus, management of index 0 is performed similarly to the memory manager described above that manages as a characteristic array of Free and Taken indices. However, because of the limited number of indices managed in this manner (e.g., one index in the example), management of the index does not materially affect the latency or reset operations. It would be possible to manage several of the first indices in the same manner.

If The total number of all the indices represented by the labeled tree illustrated in FIG. 4 is N, where N=Cap−1, and is all indices in memory 100 except index 0. The branching of the tree and number of tree levels are chosen so that $$2k^l \geq N, \qquad (1)$$

where k is the number of children of a parent vertex and l is the number of levels in the tree. In the example of FIG. 4, N=32 (which is the capacity of the tree), k=2 (meaning there may be 2 branches from each parent in a subtree), and l=4, which is the minimal number of levels where N=32.

In typical cases k=16, 32, or 64 (as opposed to 2 in the example of FIG. 4). Equation (1) expresses that the number of vertices at the bottom level in the tree is greater than or equal to the number of all indices, less 1 (because index 0 is treated separately).

The number of vertices in the bottom level (herein designated T[l−1]) is equal to ceil(N/2k). The number of vertices in each level above the bottom level (herein designated T[i]) is equal to ceil(T[i+1]/k). Thus, for the tree illustrated in FIG. 4 where there are four levels (l=4) and 33 indices (N=32), the bottom level, designated level 3, contains 8 vertices (vertices 216–230). The next level, designated level 2, contains 4 vertices (T[2]=ceil(T[3]/k)=4) (vertices 208–214), level 1 contains 2 vertices (T[1]=2) (vertices 204 and 206) and level 0 contains 1 vertex (T[0]=1) (vertex 202). Top vertex 200 is not included as a level. Note that Equation (1) assures that T[1]≦k.

The vertices are numbered through the tree from the entry point 200. The first vertex in a given level is the lowest vertex number of the level; level[i] is the vertex number from which level i starts. The only vertex in the top level 0 is designated 0 (level [0]=0). The first vertex in each level down through the tree is designated level[i]=T[i−1]+level[i−1]. Thus, in the example of FIG. 4, the first vertex in level 1 is level[1]=1, the first vertex in level 2 is level[2]=3, the first vertex (or leaf) in the bottom level (level 3) is level [3]=7. The total number of vertices in the tree is M=T[l−1]+level[l−1], which, in the example of FIG. 4, M=15 (again, Top vertex 200 is not considered).

The enumeration of tree vertices is called a global enumeration. The vertices can also be enumerated at a given level, from left to right, called a level enumeration. The global and level enumerations are convenient for navigating between vertices to address external memory 100, such as when executing READ and WRITE operations.

As noted above, each intermediate vertex (vertices 202–214) of the tree is associated with a binary word having a length of 2k-bits, consisting of k 2-bit labels. These labels are stored in the external memory 100, requiring an additional capacity equal to M−T[l−1]=level[l−1]·2k-bit words. For any given internal vertex v, the k 2-bit labels in the vertex identify the status of subtrees S_1, S_2, . . . ,S_k whose common parent is the given vertex v. The bottom level (level l–1) consists of, the characteristic array of indices from the set l\{0}.

In addition, a Top auxiliary vertex is a 2-bit label of the entire tree, but is excluded from the vertex enumerations described above.

FIG. 4 is an example of a labeled tree for a memory 100 having a capacity of 33 indices (Cap=33, N=32), where k=2 and l=4. Hence, T[3]=8, T[2]=4, T[1]=2, T[0]=1 and level [0]=0, level[1]=1, level[2]=3, level[3]=7 and M=15. The Figure illustrates an example of labels in each vertex. Label L[v] in vertex 204 is 1110, which is stored in external memory 100, at location A=1, thus MEMORY[1]=(1110). Label L[v] consists of two 2-bit labels, one for each of two subtrees. The label 11 is the left subtree S_1 rooted in vertex 208 and label 10 is the right subtree S_2 rooted in vertex 210. The first label consists of FLAG_EXIST=1 and FLAG_FULL=1 which means that subtree S_1 has been already visited since last reset and that there are no more Free indices available there. The second label (1,0) also means that subtree S_2 was already visited but Free indices are available in it. Indeed, vertex 220 includes a Free index at 9, which corresponds to a Free index 10 (level enumeration starts with number 0, whereas index enumeration starts with number 1).

INIT and RESET Commands.

INIT and RESET operations are quite simple and fast. The status of index 0 is set to Taken, as previously described, and INDEX_OUT and FLAG_EMPTY are set to 0. Top vertex 200 is set to (0,*), where * designates "don't care" value. As previously described, the binary "0" at the odd position indicates that the entire subtree corresponding to that label has not been visited since the last reset operation. With Top vertex 200 set to (0,*), the entire tree has not be visited since the last reset, meaning the entire tree is available for allocation.

ALLOC Command.

When the status of index 0 is Free, the ALLOC Command ALLOC simply changes the status of index 0 to Taken. The tree of FIG. 4 is not employed.

If the status of index 0 is Taken, the tree of FIG. 4 is employed to execute the command. Starting from the Top vertex 200, a search is made of the FLAG_FULL flags in each vertex, commencing with the left-most vertex of each level and moving to the right-most vertex and thence to the next lower level. The first vertex containing a 0-valued FLAG_FULL flag is located, and subtrees are followed from the designated vertex to the bottom level to find a Free status associated with an index.

Figure 5:
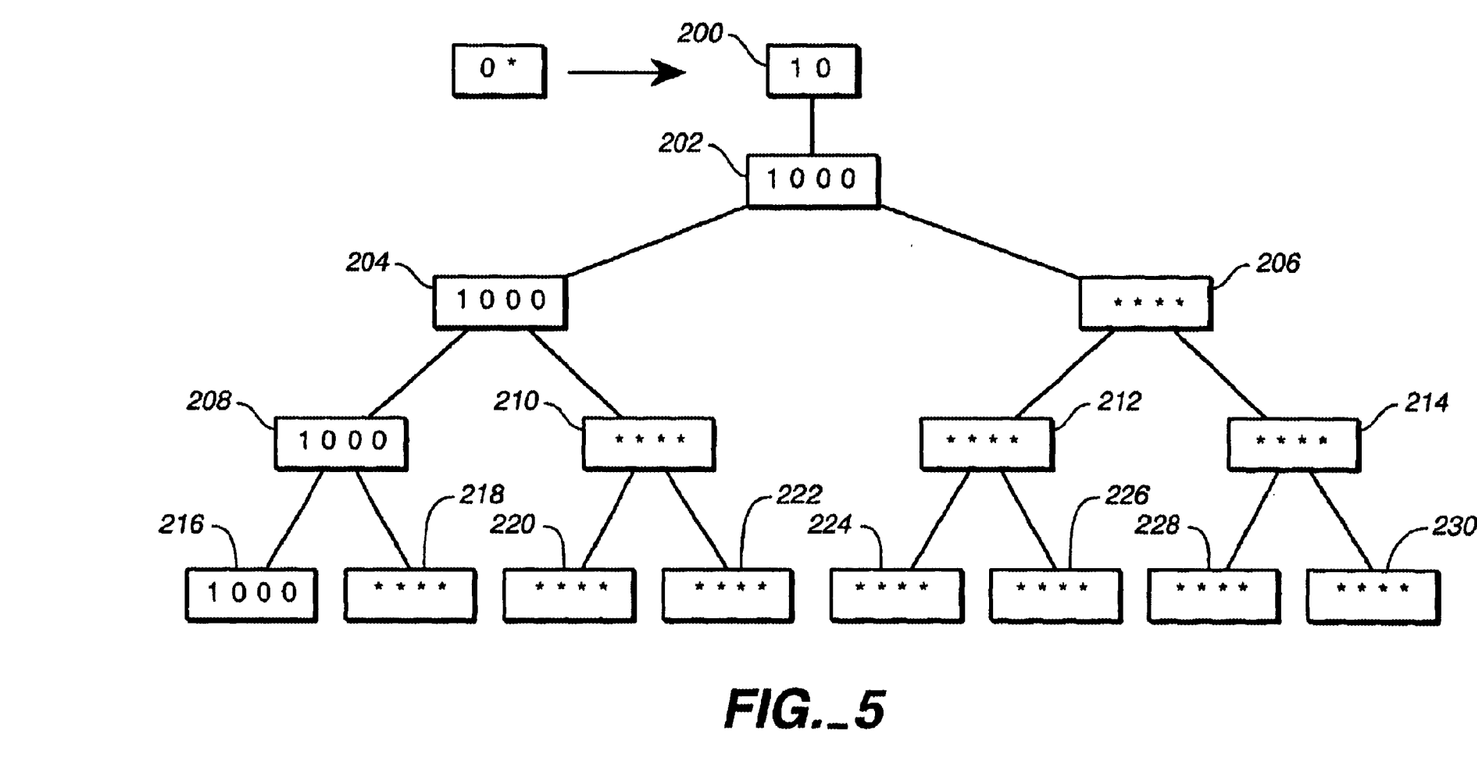

If the Top vertex contains (0,*) indicating that the tree has not been visited since the last reset, the manager simply sets top vertex to (1,0) to represent to future searches that the tree has been visited since the last reset and it contains at least one bottom vertex containing a Taken representation. The search traces down the tree to the first bottom vertex 216, setting the word in the first vertex of each level to (1,0,0, . . . ,0). This sets the first representation to "Taken" and indicates that the first bottom vertex 216 has been visited since the last reset. This is illustrated in FIG. 5. The memory manager will operate in a similar manner from a hierarchical vertex containing a FLAG_EXIST=0 label during searches that find only FLAG_FULL=1 flags (explained below in connection with FIGS. 6 and 7). Hence, if only FLAG_FULL=1 flags are found in labels along the tree (which means the respective bottom vertices contain only Taken representations), a FLAG_EXIST=0 flag at an even position in a vertex will cause the memory manager to trace down a subtree from that vertex setting words in each vertex to (1,0,0, . . . ,0). In other words, if the first 0 (starting from the left) in a vertex label is in an odd position (i.e., FLAG_FULL=0), the process goes to the corresponding child vertex following the path to the bottom vertex. If the first 0 is in an, even position (i.e., FLAG_EXIST=0), the memory manager traces down a subtree from that vertex and sets words in each vertex to (1,0,0, . . . ,0). The resulting bottom level vertex provides at least one free index.

Figure 6:
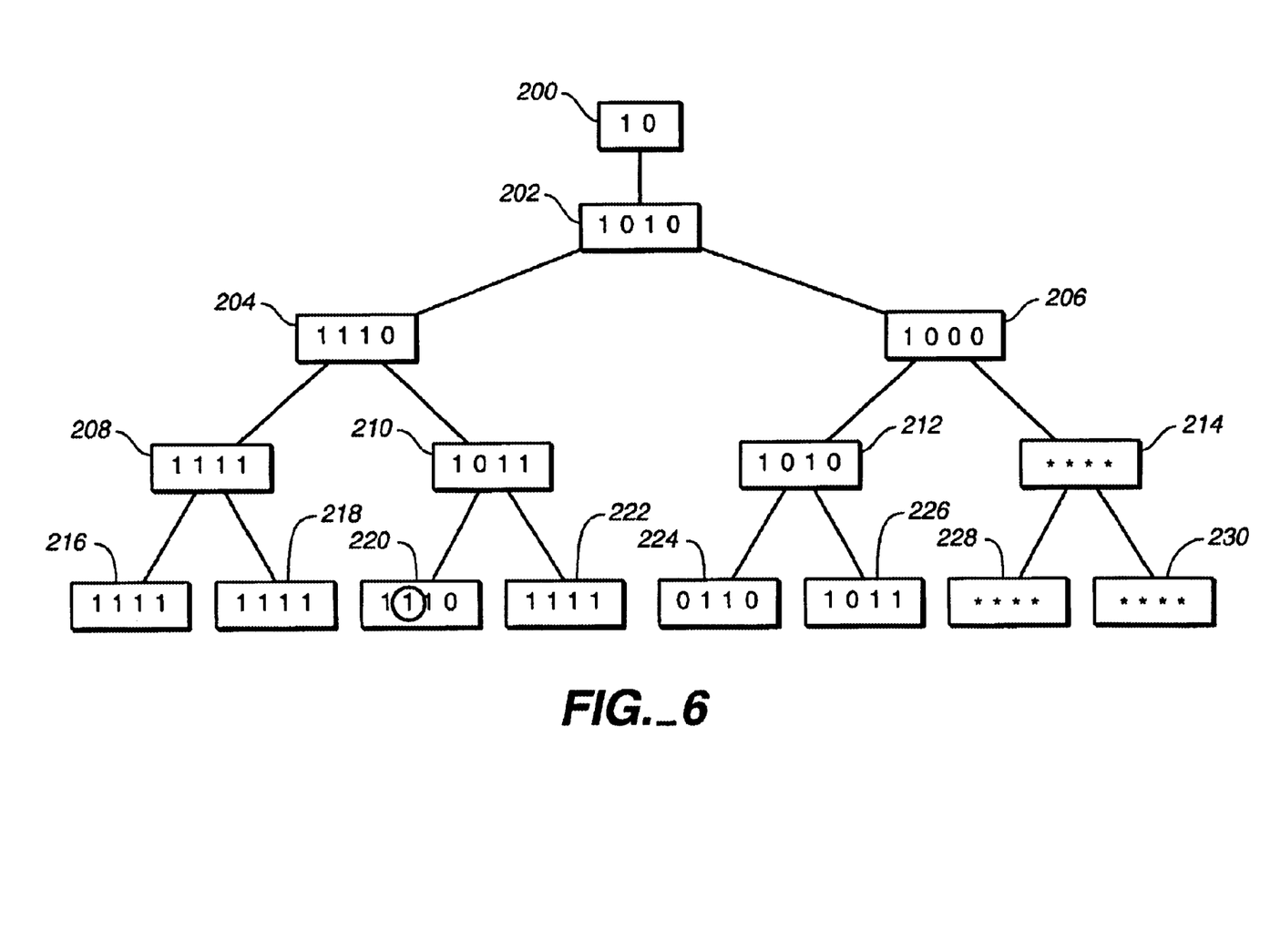

Another example may be explained with reference to FIG. 4. There, the FLAG_EXIST=1 bits in labels in vertices 202–212 indicate that the respective subtrees have been visited since the last reset, meaning that status bits in bottom vertices 216–226 indicate that some corresponding indices are "Taken". The first FLAG_FULL=0 status is the second bit in vertex 202. That bit is associated with vertex 204, whose first FLAG_FULL=0 status is the fourth bit, leading to vertex 210. The FLAG_FULL=0 bit in vertex 210 leads to vertex 220 containing a Free bit (0) at position 9 (Address 10). As shown in FIG. 6, that bit is changed to 1, thereby establishing the index at address 10 in memory 100 as Taken.

Since, in the example to FIG. 6, there is still another Free index representation in vertex 220, the FLAG_FULL=0 status in vertices 210, 204 and 202 remain unchanged. The index or address 10 in memory 100 is output as previously described.

Figure 7:
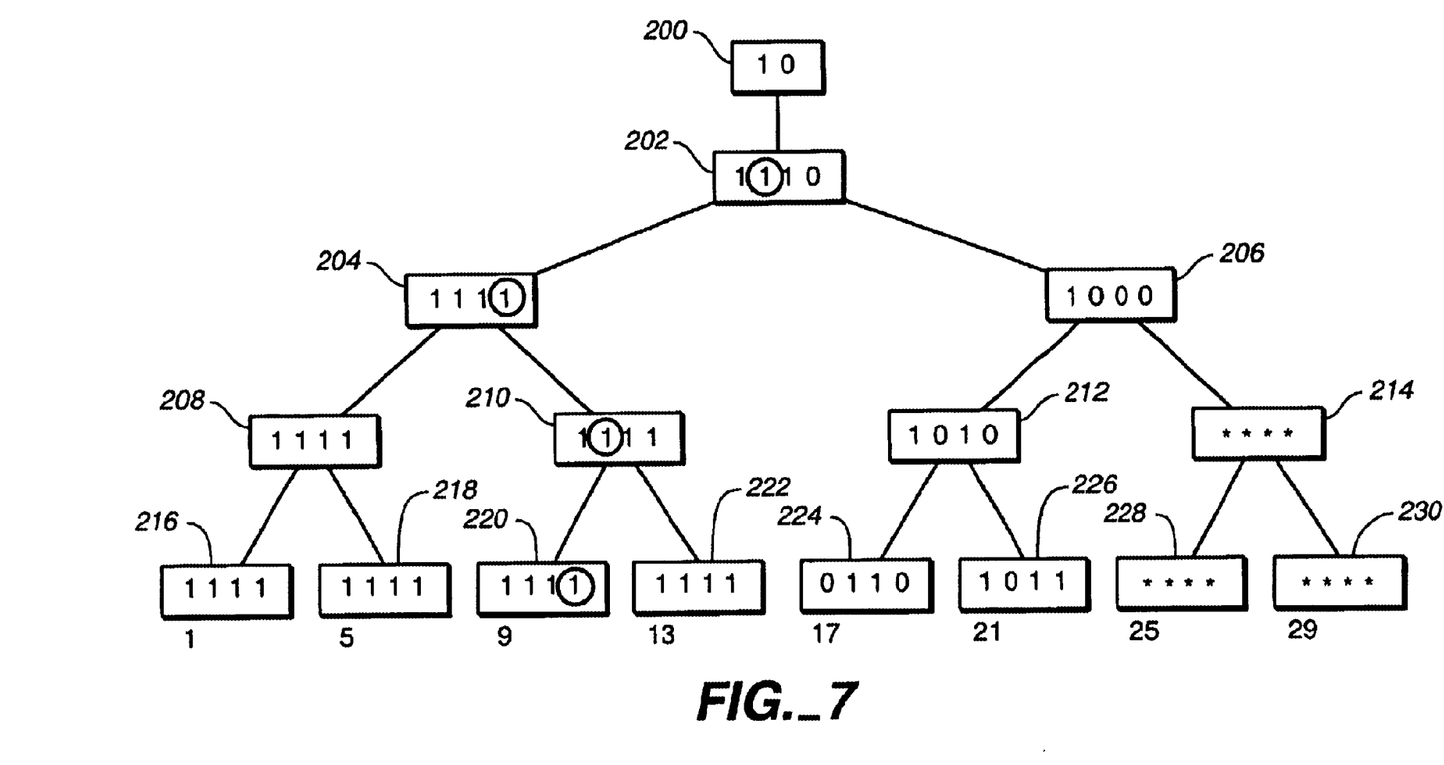

Instead of starting with the condition of FIG. 4 where two Free indices are represented in vertex 220, assume the search started with the condition of FIG. 6 so that when reaching vertex 220 only the last-remaining Free index represented by the vertex is changed to Taken. In this case, after changing the index status for index 11 (address 12) to 1, the vertex contains (1111). It is necessary to edit the FLAG_FULL flags moving up the tree from the vertex just edited (vertex 220). This is illustrated in FIG. 7 where the FLAG_FULL flags in the vertices that established the path to vertex 220 are changed from 0 to 1 on the path until a vertex label containing either two FLAG_FULL=0 flags, or one FLAG_FULL=0 flag and at least one FLAG_EXIST=0 flag, is reached, which in this case is vertex 202. If the last vertex is the Top vertex, its label is changed from (1,0) to (1,1), meaning that the tree now contains no Free indices, and the controller sets FLAG_EMPTY=1.

FREE Command.

The FREE Command for index 0 is executed simply by changing the status of index 0 to Free. If an index other than index 0 is to be set Free, the tree of FIG. 4 is employed.

Figure 8:
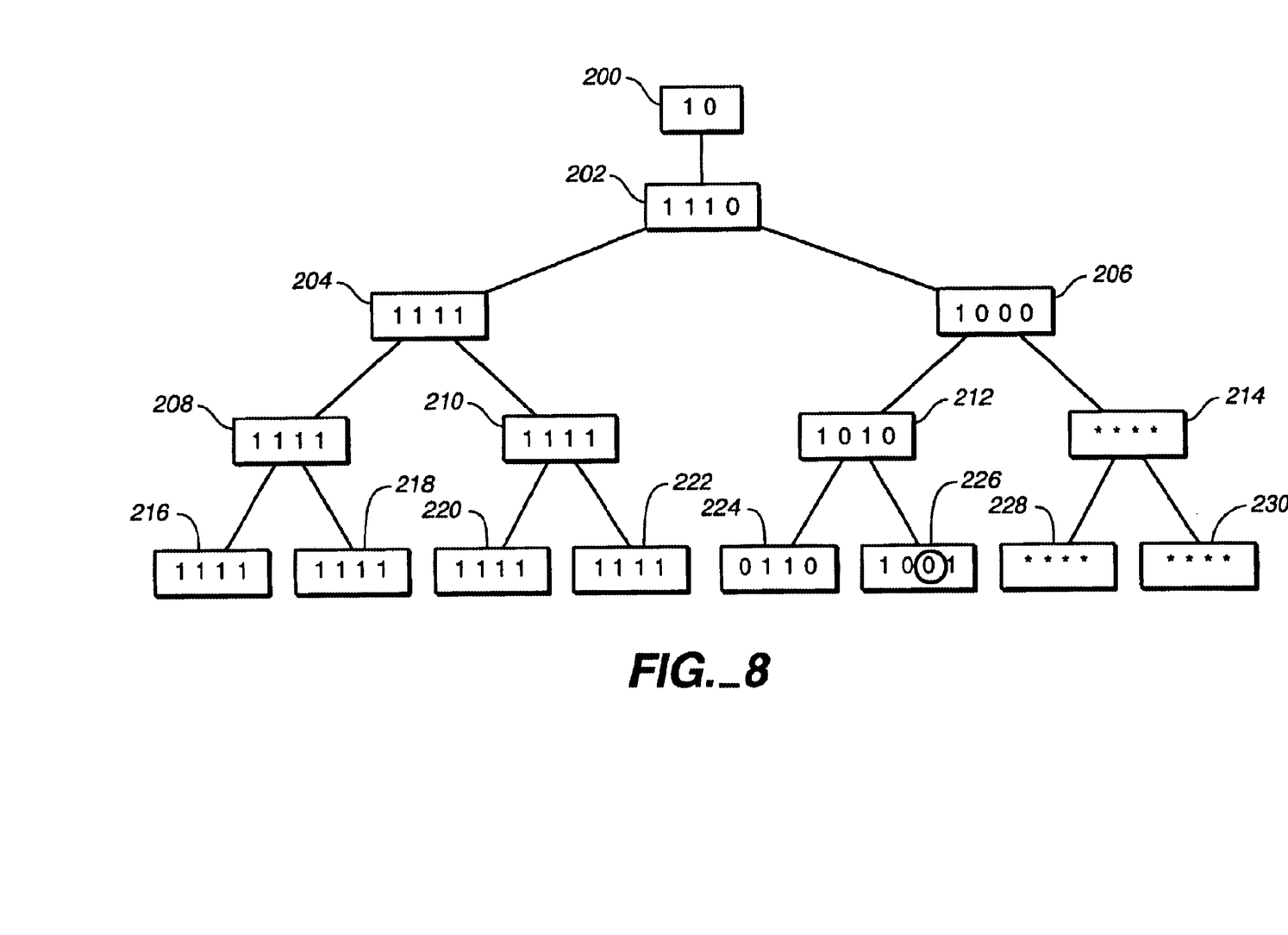
Figure 9:
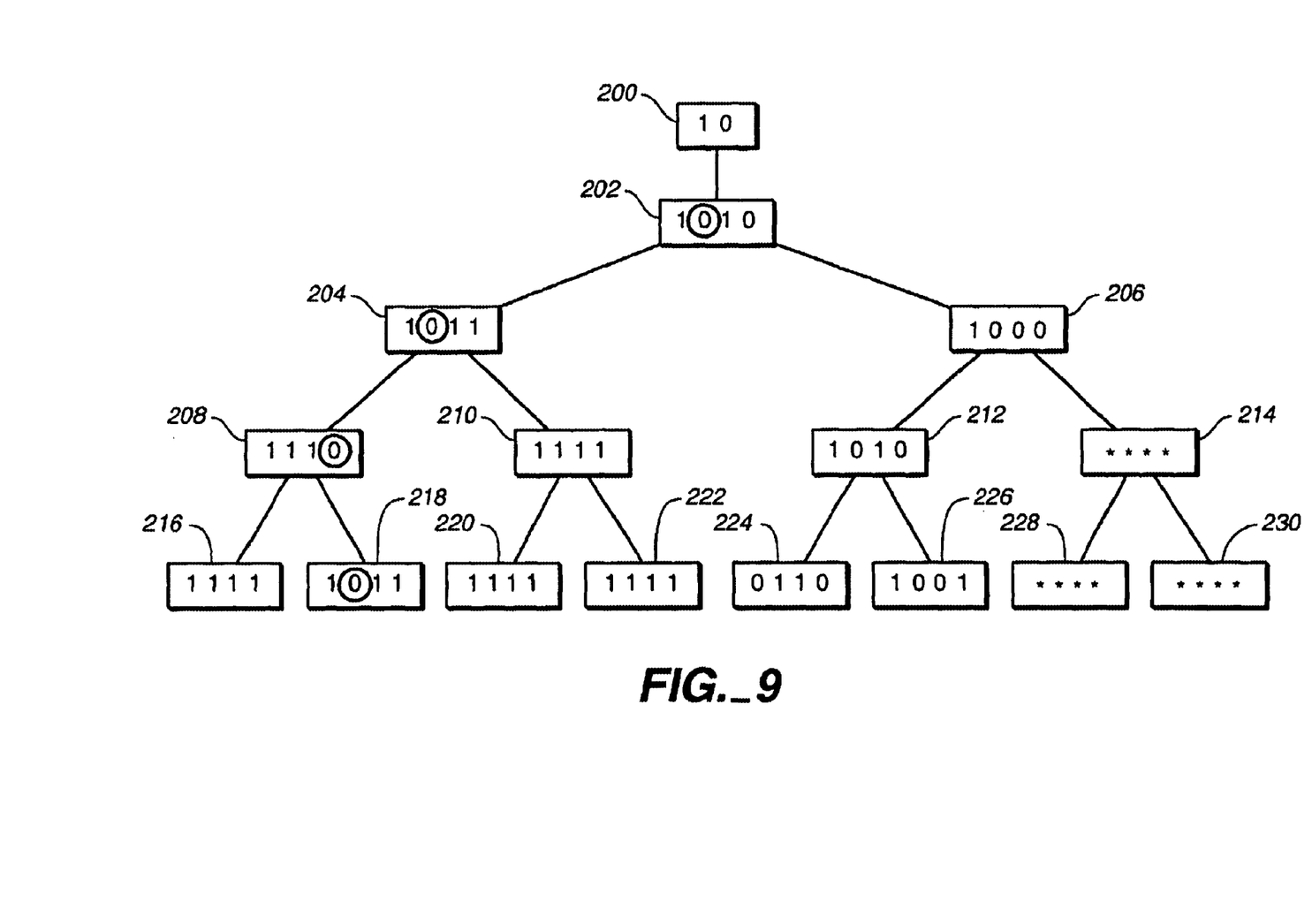

In this case the FREE command is executed commencing at the bottom level of the tree in the vertex or leaf containing the Taken status (1-bit) that corresponds to the index i to be set free. Since the index i is known, the number of the vertex and its bit position in the vertex can be easily calculated. The value of that bit is changed to 0, as shown in FIG. 8 for index i=23. If necessary, the values of the FLAG_FULL bits in the parent vertices may be edited from 1 to 0 as described in the case of ALLOC command. For example, if the index or address 7 is to be set Free, the second bit in vertex 218 is changed to 0, indicating a Free status to the index, and corresponding FLAG_FULL bits in vertices 208, 204 and 202 are also changed to 0, as shown in FIG. 9.

The latency of controller 102 is based on the number of operations of memory manager 104 involving external memory 100. In a worst-case scenario, an ALLOC command (with editing) requires no more than 3l–1 clock cycles and a FREE command requires no more than 2l clock cycles with external memory, where l is the number of levels in the labeled tree. In most cases where editing of the tree is not required, an ALLOC command will require l+1 clock cycles and a FREE command will require 2 clock cycles. Initializing and reset operations require a single clock cycle of setting the top vertex 200 to (0,*) as previously described.

The latency can be further reduced by storing the vertex labels along the path from Top vertex 200 to the vertices 216–230. In such a case the worst-case latency to execute an ALLOC command is reduced to 21 clock cycles. Moreover, if a separate external memory is employed for each level of the tree (without increasing total memory size) the worst-case latency is further reduced to l for both the ALLOC and FREE commands. Maximum latency can also be reduced using pipeline processing.

Memory manager 104 provides fast management of the memory with minimal increase in memory capacity. Controller latency is minimized, and the time required for a reset operation is reduced to one time unit (one clock cycle). Depending on the word length (k), memory manager 104 may be constructed in a labeled hierarchical tree as described herein at an expense of increasing memory 100 by about 2%–7%. For example, a memory 100 for storing 1K (1024) indices using 64-bit memory words (k=32) will require a 1024-bit memory capacity to store the characteristic array in 16 bottom level vertices 216–230 and a 64-bit memory capacity to store the label(s) in one vertex. Consequently, the label(s) represent about 6% additional memory capacity over the capacity required for only the characteristic array.

The invention is preferably embodied in an integrated circuit (IC) chip of a computer to carry out the memory management process herein described. The chip may be a memory chip, in which case memory manager 104 may reside on the same IC chip as the memory 100 being managed, or it may reside on an IC chip that is separate from memory 100 so that memory 100 may be a different memory chip, a hard drive, or an external memory.

The invention may also be embodied as computer readable program code that is stored as a computer useable program on a computer readable medium that causes a computer to manage a memory as herein described. For example, the memory manager may be included on a transportable computer readable medium, such as a floppy disk or the like or on a hard drive medium to manage the hard drive memory, or an external memory associated with the computer.

Although the present invention has been described with reference to preferred embodiments, workers skilled in the art will recognize that changes may be made in form and detail without departing from the spirit and scope of the invention.

What is claimed is:

1. A process of managing free addresses in a memory, comprising steps of:
   a) providing a hierarchical tree containing a plurality of vertices arranged in a plurality of levels such that a bottom level contains a plurality of bottom vertices each containing a plurality of representations of a Free or Taken status of respective addresses in the memory, a top vertex, and at least one intermediate level between the top vertex and the bottom level containing at least one hierarchy vertex, each hierarchy vertex having a plurality of child vertices in a next lower level and each bottom vertex being a child to a respective hierarchy vertex in a lowest intermediate level, each hierarchy vertex containing a plurality of labels such that each label is associated with a child vertex and defines whether or not a path that includes the respective child vertex ends in a respective bottom level vertex containing at least one Free representation;
   b) input a memory command to the tree; and
   c) changing the representation of the status of an address based on the command.

2. The process of claim 1, wherein each label further defines whether the child vertex has been addressed since an initializing or reset command.

3. The process of claim 2, wherein the command is an initializing or reset command, and step (c) includes changing the status of the label in the top vertex to reflect that the entire tree has not been addressed.

4. The process of claim 1, wherein the command is an allocation command to change the status of an address from Free to Taken, wherein step (b) comprises:
   b1) input the allocation command to the top vertex containing a label representing that a subtree contains a path ending in a bottom level vertex containing a Free representation, and
   b2) following the path to the bottom level vertex containing the Free representation, and wherein step (c) comprises:
      c1) changing the representation of the Free status in the bottom level vertex to Taken.

5. The process of claim 4, wherein step (c) further includes:
   c2) examining the bottom level vertex containing a representation changed from Free to Taken to determine whether the vertex contains only Taken representations, and
   c3) if the bottom level vertex contains only Taken representations, changing the label in the vertex in the next higher level associated with the bottom level vertex to define that the bottom level vertex contains only Taken representations.

6. The process of claim 5, wherein step (c) further includes:
   c4) examining the status of labels in each hierarchical vertex along a path from the bottom level vertex to the top vertex to identify if all other labels in the respective hierarchical vertex represent subtrees terminating in bottom level vertices containing only Taken representations, and
   c5) changing the label in each hierarchical vertex along the path to indicate that all paths from the hierarchical vertex end in bottom level vertices containing only Taken representations, until a hierarchical vertex is found containing another label defining a path to a bottom level vertex containing at least one Free representation, wherein the allocation operation requires no more than 3l–1 clock cycles, where l is the number of levels of the tree.

7. The process of claim 1, wherein the command is a free command to change the status of a specific address to Free, wherein step (b) comprises:
   b1) input the free command to the bottom level vertex containing a representation of the status of the address, and step (c) comprises:
      c1) changing the representation associated with the address in the bottom level vertex to Free.

8. The process of claim 7, wherein step (c) further includes:
   c2) examining the bottom level vertex containing a representation changed to Free to determine whether the vertex contains only the one Free representation, and c3) if the bottom level vertex contains only one Free representation, changing the label in the hierarchical vertex in the next higher level associated with the bottom level vertex to define that the bottom level vertex contains at least one Free representation.

9. The process of claim 8, wherein step (c) further includes:
c4) examining the status of labels in each hierarchical vertex along a path from the bottom level vertex to the top vertex to identify if all other labels in the respective hierarchical vertex represent subtrees terminating in bottom level vertices containing only Taken representations, and
c5) changing the label in each hierarchical vertex along the path to indicate that at least one path from the hierarchical vertex ends in a bottom level vertex containing a Free representation, until a hierarchical vertex is found containing another label defining a path to a bottom level vertex containing at least one Free representation, whereby the freeing operation requires no more than 2l clock cycles, where l is the number of levels of the tree.

10. The process of claim 1, wherein each label contains a word having 2k bits, where k is the number of branches from each hierarchical vertex, and the hierarchical tree is stored in the memory occupying 2k·M bits, where M is the number of vertices in the tree.

11. A memory manager for managing allocation of addresses in a memory, the memory manager including a hierarchical tree structure comprising:
a top vertex;
a bottom level containing a plurality of bottom vertices each containing a plurality of representations of a Free or Taken status of respective addresses in the memory, and
at least one intermediate level between the top vertex and the bottom level containing at least one hierarchy vertex containing a plurality of labels such that each label is associated with a child vertex and defines whether or not a path that includes the respective child vertex ends in a respective bottom level vertex containing at least one Free representation.

12. The memory manager of claim 11, wherein each label contains a word having 2k bits, where k is the number of branches from each hierarchical vertex, and the hierarchical tree is stored in the memory occupying 2k·M bits, where M is the number of vertices in the tree.

13. The memory manager of claim 11, wherein the top vertex contains a label that defines whether or not the tree includes a bottom level vertex containing at least one Free representation.

14. The memory manager of claim 13, wherein each label includes a first bit that defines whether the respective child vertex has been accessed since a reset operation and a second bit that identifies whether a respective bottom level vertex contains at least one Free representation.

15. The memory manager of claim 14, wherein a reset command is performed in a single clock cycle of the memory to set the first bit in the top vertex to indicate that the tree has not been accessed since a reset operation, whereby a subsequent allocation operation sets the first bit in labels of vertices along a path between the top vertex and a first bottom level vertex to indicate that the path has been accessed since the most recent reset operation.

16. The memory manager of claim 14, wherein a command to free an index in the bottom vertex changes the label in the hierarchical vertex in the next higher level associated with the bottom level vertex to define that the bottom level vertex contains at least one Free representation, and a command to allocate an index in the bottom level changes the label in each hierarchical vertex along the path to indicate that all paths from the hierarchical vertex end in bottom level vertices containing only Taken representations, until a hierarchical vertex is found containing another label defining a path to a bottom level vertex containing at least one Free representation, whereby the freeing operation requires no more than 2l clock cycles and the allocation operation requires no more than 3l−1 clock cycles, where l is the number of levels in the tree.

17. A computer useable medium having a computer readable program embodied therein for addressing data, the computer readable program comprising:
first computer readable program code defining a hierarchical tree containing a plurality of vertices arranged in a plurality of levels such that a bottom level contains a plurality of bottom vertices each containing a plurality of representations of a Free or Taken status of respective addresses in the memory, a top vertex, and at least one intermediate level between the top vertex and the bottom level containing at least one hierarchy vertex, each hierarchy vertex having a plurality of child vertices in a next lower level and each bottom vertex being a child to a respective hierarchy vertex in a lowest intermediate level, each hierarchy vertex containing a plurality of labels such that each label is associated with a child vertex and defines whether or not a path that includes the respective child vertex ends in a respective bottom level vertex containing at least one Free representation;
second computer readable program code for causing a computer to input a memory command to the tree; and
third computer readable program code for causing the computer to change the representation of the status of an address based on the command.

18. The computer useable medium of claim 17, wherein the computer readable program includes computer readable program code that causes the computer to store the hierarchical tree in a computer memory.

19. The computer usable medium of claim 17, wherein the second computer readable program code includes:
computer readable program code responsive to an allocation command to the top vertex when the top vertex contain a label representing that the tree contains a bottom level vertex containing a Free representation to cause the computer to follow a path to the bottom level vertex containing the Free representation, and the third computer readable program code includes:
computer readable program code responsive to the result of the second computer readable program code to cause the computer to change the representation of the Free status in the bottom level vertex to Taken, whereby an allocation operation requires no more than 3l−1 clock cycles, where l is the number of levels of the tree.

20. The computer usable medium of claim 17, wherein the second computer readable program code includes:
computer readable program code responsive to an free command to the bottom level vertex containing a representation of the status of the address, and the third computer readable program code includes:

computer readable program code for causing the computer to change the representation associated with the address in the bottom level vertex to Free, whereby the freeing operation requires no more than 2l clock cycles, where l is the number of levels of the tree.

* * * * *